INVENTOR.
MAX L. POWERS
BY
*Whittemore Hulbert & Belknap*
ATTORNEYS

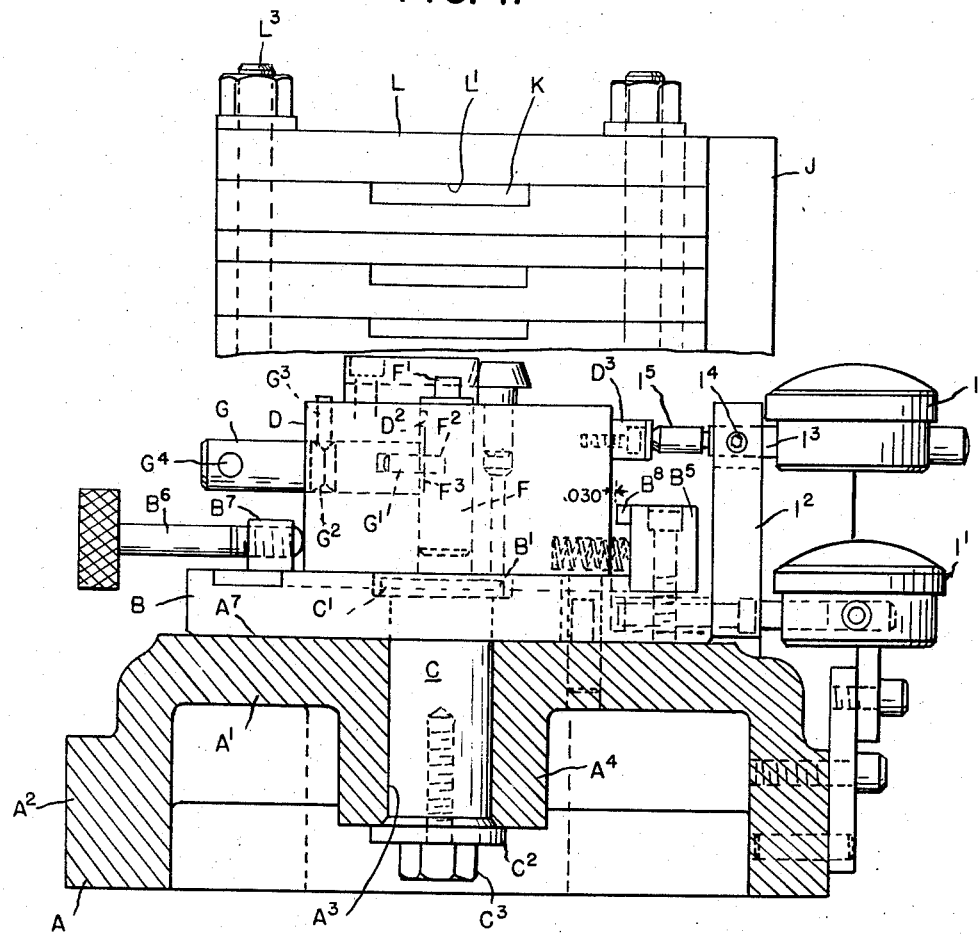
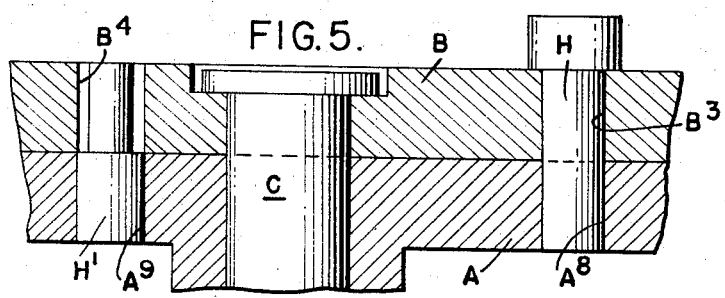

United States Patent Office 2,879,602
Patented Mar. 31, 1959

2,879,602
JET BLADE TESTING MACHINE

Max L. Powers, Detroit, Mich., assignor to Peerless Gage Company, Redford Township, Wayne County, Mich., a corporation of Michigan Application May 9, 1955, Serial No. 506,923

5 Claims. (Cl. 33—174)

The invention relates to apparatus for testing the accuracy of jet blades of various constructions. Such blades are designed to have predetermined contours in different cross sections thereof which are necessary to the greatest efficiency in operation. However, the blades vary in dimensions and also in contours according to the specific use for which they are designed. Consequently, apparatus designed for testing one specific size and form of blades could not be used for testing others of different dimensions. There are, however, limits to these variations and the basic structure of testing devices for all is similar. It is, therefore, the object of the invention to obtain a construction of universal testing machine capable of adjustment for different dimensions and specific forms of blades tested. To this end the invention consists in a testing machine including a basic structure and exchangeable parts as more fully hereinafter set forth.

Figure 1:
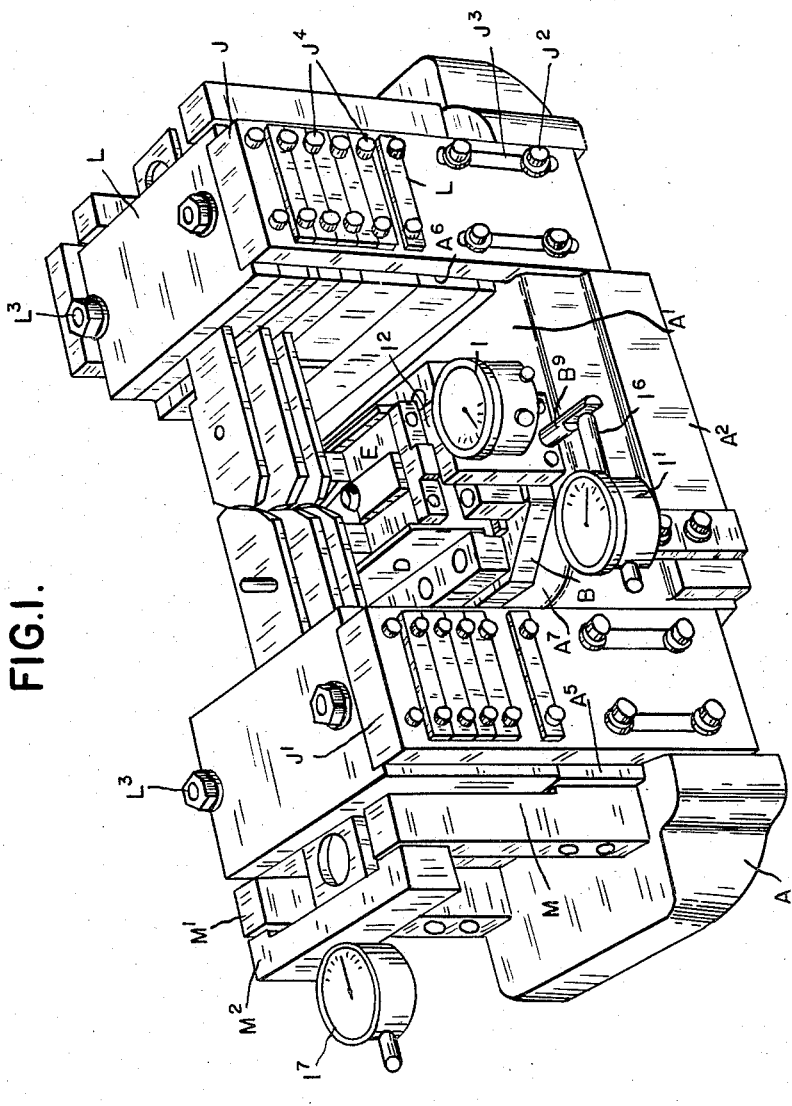
Figure 2:
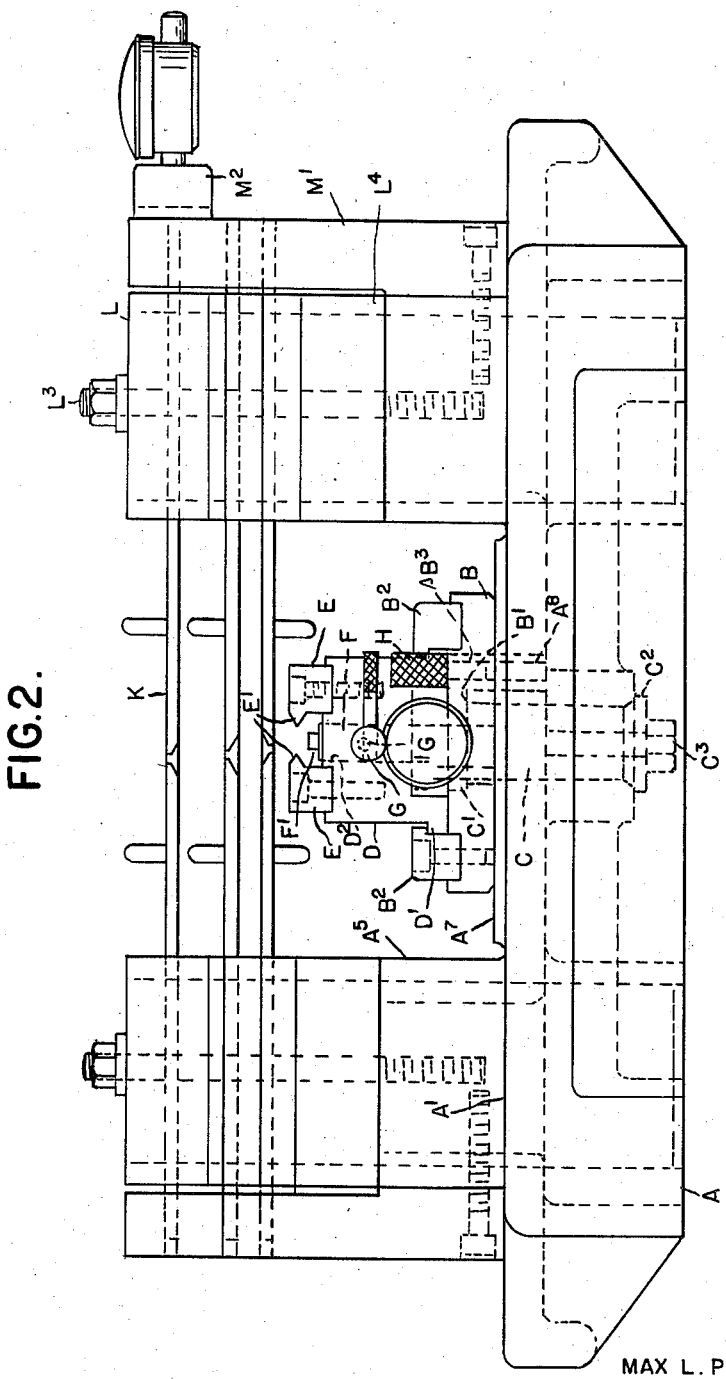
Figure 3:
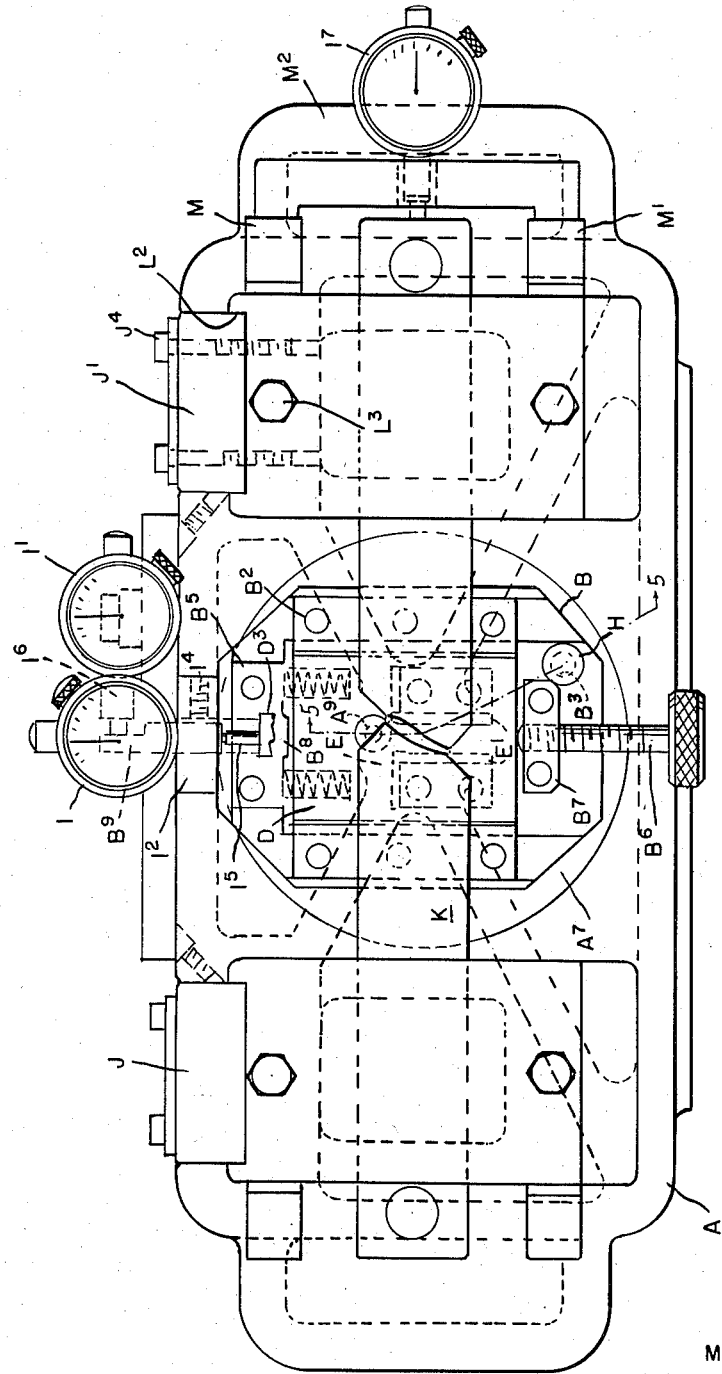

In the accompanying drawings:
Fig. 1 is a perspective view of the machine.
Fig. 2 is a front elevation thereof.
Fig. 3 is a plan view.
Fig. 4 is an end elevation.
Fig. 5 is a section on line 5—5, Fig. 3.

In general construction the testing device comprises a base on a portion of which is mounted a holder for the blade adapted to engage the root portion thereof to extend the blade portion upward therefrom. This holder is so constructed as to provide for a slight swiveling movement and also a limited radial movement with respect to the axis of the swivel. On opposite sides of this holder there are mounted on the base exchangeable bearings for a series of templates which are arranged in predetermined spaced planes and correspond respectively to the cross sectional contour of the blade in such planes. Gauges are provided for measuring any deviation from the true form of the blade being tested. These gauges include one measuring the degree of swiveling movement of the holder, one measuring the radial movement, and others for indicating any deflection of the templates in their bearings indicative of error in the portion of the blade with which each template is in contact.

To adapt such machine for the testing of blades of specific size and contours exchangeable bearings are mounted in stacks on the base so as to bring each template in its proper plane. It is, however, necessary that each bearing should be positioned with great accuracy which is accomplished by the construction as later described.

Specific construction

The base A is of oblong rectangular form and may be formed of cast metal. It includes a top portion A' and depending side flanges $A^2$. Centrally of this base there is a vertical bore $A^3$ which extends downward through a depending hub portion $A^4$ on the underside of the portion A'. On opposite sides of this bore and spaced equally therefrom are raised integral hollow portions $A^5$ of the base which form supports for the stacks of template bearings and which are of a height less than the plane of the lowermost bearing for any blade to be tested. Each of these raised portions has a vertically extending recess $A^6$ in one face thereof which extends downward through the side flange $A^2$ and is adapted to receive and position a column member which will be later described.

B is a polygonal member shown as of octagonal form which is supported on a horizontal face $A^7$ and is swiveled by a pin C extending centrally therethrough and through the bore $A^3$. The pin C has a head C' engaging a counterbore in the member B to bear against an annular shoulder B'. At the lower end of the pin C is a slightly coned attachable head $C^2$ which is secured to the pin by a tap bolt $C^3$. This construction will hold the member B against the face $A^7$ while permitting a swiveling movement thereon. Mounted on the member B is a member D which forms a portion of the holder for the blade to be tested. The member D has projecting flanges D' on opposite sides thereof which engage parallel guideways $B^2$ secured to the member B so as to permit movement in said guideways transversely of the base. At the top of the member D are spaced parallel members E for receiving therebetween the root portion of a jet blade to be tested. These members E have inwardly projecting tapering flange portions E' which extend over the upper face of said root portion as later described. There is also a vertical bore $D^2$ in the member D for receiving a clamping pin F bearing against the underside of the root of the blade and having a pintle F' engaging a recess therein. The pin F is raised or lowered by a horizontally extending rotary shaft member G engaging a corresponding bore in the member D and having at its inner end an eccentric pin G' engaging a transverse slot $F^2$ in the member F. An annular groove $G^2$ in the shaft G engaged by the end of a screw $G^3$ in the member D holds the shaft G from longitudinal movement and the pin F has flattened portions $F^3$ against which the inner end of said shaft bears. The outer end portion of the shaft G projects beyond the member D and has an actuating arm $G^4$ projecting therefrom through which the shaft may be turned to move the pin F upward or downward by the eccentric pin G'. By this construction the root portion of the blade may be rigidly clamped to the member D but the latter is movable radially with respect to the axis of the pin C and rotatively with the member B about said axis. However, provision is made for holding the member D rigid and in an exact position with respect to the member B and for also holding said member B in exact position with respect to the base A. For the latter purpose the member A has two bores therein $A^8$ and $A^9$ through the face $A^7$ thereof. The member B also has two bores $B^3$ and $B^4$ therein which register with the bores $A^8$ and $A^9$. A pin H detachably engages the bores $B^3$ and $A^8$ to hold their respective members in fixed relation to each other. A pin H' has a portion fitting the bore $A^9$ and extending into the bore $B^4$ but of smaller diameter than the latter so as to permit a limited relative swiveling movement of the member B on the member A. Thus, as just stated the pin H when engaged with the apertures $B^3$ and $A^8$ holds these members from relative movement but when this pin is removed the pin H' will permit a limited swiveling movement of the member B on the base A. The means for holding the member D in fixed relation to the member B comprises a block $B^5$ secured to the member B and extending transversely to the direction of the parallel guides $B^2$. There is also an adjustable screw $B^6$ threadedly engaging a member $B^7$ which is secured to the member B on the opposite side of the member D from that on which the block $B^5$ is located. The block $B^5$ has near its upper end a flange $B^8$ projecting towards the member D which forms a stop for said member and by adjusting the screw $B^6$ the member D may be moved against said stop. However to provide a predetermined clearance between the member D and the stop $B^8$ a feeler of predetermined thickness, such for instance as .030 of an inch, may be placed between the member D and the stop before the screw $B^6$ is tightened. When this feeler is removed there will be this amount of clearance between the member D and the stop, and by unscrewing the member $B^6$, clearance will be provided in the opposite direction. The amount of radial movement of the member D from its fixed position is indicated by a gauge member I, and the amount of swiveling movement of the member B from its fixed position is indicated by a gauge I'. These gauges are mounted on the base A and have their actuating members extending in operative relation, respectively, to the members D and B. The mounting for the gauge I is a post $I^2$ secured to the member B and extending upward to approximately the height of the member D. A shank $I^3$ on the side of the gauge extends into an aperture on the post $I^2$ and is secured by a set screw $I^4$. The actuating member $I^5$ of the gauge extends outward through the hollow shank $I^3$ towards the member D adjacent to a bearing $D^3$ thereon. The mounting for the gauge I' is secured to the side of the flange $I^2$ and the gauge actuating member $I^6$ projects therefrom into the path of a finger $B^9$ extending radially from the member B. These gauges may be set so that when the members D and B are in fixed position with relation to the base A the gauge would indicate zero and the degree of any movement away from such position will be indicated by said gauges.

As above stated the accuracy of the blade with respect to cross sectional contour and relation to its root portion is tested by a series of templates arranged in different horizontal planes and adjustably held therein by bearings which are stacked upon the raised portions $A^5$ of the base. As different jet blades vary in dimensions and contours it is necessary to provide exchangeable templates and also exchangeable bearings for holding said templates in their proper planes. As previously described the raised portions $A^5$ have vertical recesses $A^6$ in one face thereof which extend downward through the flange $A^2$. This permits of erecting columns J, J' of rectangular cross section in said recesses to extend upward above the portions $A^5$ and also to be vertically adjustable in relation to said portions and the base A. The columns J, J' are attached to the base by clamping screws $J^2$ which pass through vertical slots $J^3$ in said columns so as to permit of such vertical adjustment. The exchangeable templates K are bars of uniform rectangular cross section which are slidably held in exchangeable bearing members L formed of blocks or plates arranged in a stack above the raised portions $A^5$. Each bearing member L has a recess L' therein for receiving one of the template bars, the enclosure of which is completed by a face of the adjacent bearing member. Each bearing member has also a recess $L^2$ therein for engaging a column member J or J' to which said member is secured by clamping bolts $J^4$ passing through vertical apertures in said column and engaging threaded apertures in the end of said bearing, as shown in Fig. 3. This will insure that each template is accurately positioned in its plane. Each stack of bearing members L is secured to the base A by vertically extending clamping bolts $L^3$ and the construction is such that each of the templates is held in its proper plane and is slidable in its bearing member towards or from the blade being tested. The templates are prefashioned to correspond in contour to that of the blade in the same plane so that if the blade is correct in form and in position the template will exactly fit the same. On the other hand if the contours do not match, the template will be moved outward in its bearing L, and this will also occur if the blade leans one way or the other from the vertical. To measure the amount of such displacement a gauge is provided together with a mounting therefor by which it may be alternatively registered with the plane of each of the templates. Such mounting is formed by a pair of columns M, M' bolted to the outer end faces of the raised portions $A^5$ to extend upward thereabove. A bridge member $M^2$ extends across between the columns M, M' and is adapted to be bolted thereto in each of the planes of the templates K. A gauge $I^7$ is mounted on the bridge member $M^2$ and is carried by the latter into operative relation to the templates in the several planes. Thus, each template may be tested to determine how far it is displaced from the position it would occupy if the corresponding portion of the blade were in true form.

With the construction as above described it is possible to use the same base, together with the blade holder thereon and its test gauges, for testing a blade of any specific dimensions and contours. To adapt the structure for such specific use exchangeable bearings L of selected thickness are arranged in a stack on each of the raised portions $A^5$ and are secured thereto and to the columns, J, J' as above described. These members L may include a spacer member $L^4$ arranged between the lowermost of the bearing members and the raised portion $A^5$. Exchangeable templates K are also selected for engagement with the bearings L which correspond in contour to the cross sectional contours in the several planes thereof. It is obvious that the cost of such universal blade testing device is very much less than the total cost of separate testing devices for each individual size or form of blade.

What I claim as my invention is:

1. Apparatus for testing the accuracy in form of jet propeller blades and the like and for measuring the degree of inaccuracy thereof comprising a base, a blade holder mounted on said base with freedom for limited swiveling and radial movements thereon, a stack of exchangeable blade contact templates and individual slide bearings therefor mounted on said base at one side of said blade holder, means for exactly positioning each stack on said base consisting of a column of oblong rectangular cross section rigidly connected to said base in a recess in the side thereof to extend exactly vertically upward therefrom, each of said bearings being channeled to fit said cross section, and clamping means for securing each exchangeable bearing to said column in its particular plane in the stack, and gages for separately measuring the swiveling and radial movements of said blade holder on said base and sliding displacement of each template in its bearing.

2. The construction as in claim 1 in which said indicating means is a gauge for measuring the degree of displacement of a template from the position it would occupy when contacting a true blade, and a mounting on said base for locating said gauge in the plane of said template.

3. The construction as in claim 1 including another column rising from said base, and a single gauge adjustably mounted on said column to be successively in the planes of said templates.

4. The construction as in claim 1 in which said blade holder includes a member directly swiveled on the base, a second member radially movable on the last mentioned member, and blade clamping means on said second member, registering bores respectively in said radially movable member and swivel member and in the latter member and said base, pins engageable with said registering bores to hold said members from movement, and gages mounted upon said base adjustable to have their operating members respectively contacting with said swivel member and radially movable member when both are held stationary by said pins to set each at zero, whereby upon the removal of said pins the displacement of said members can be measured.

5. The construction as in claim 4 provided with a smaller diameter pin for insertion in said registering apertures in said swivel member and base after withdrawal of the aforementioned pin therefrom for limiting the swivel movement.

References Cited in the file of this patent

UNITED STATES PATENTS

| | | |
|---|---|---|
| 1,364,534 | Walter | Jan. 4, 1921 |
| 1,729,812 | Andrews | Oct. 1, 1929 |
| 2,309,142 | Stafford | Jan. 26, 1943 |
| 2,412,569 | Dugger | Dec. 17, 1946 |
| 2,452,544 | Brodie | Nov. 2, 1948 |
| 2,504,961 | Braaten | Apr. 25, 1950 |
| 2,524,538 | Pearson | Oct. 3, 1950 |
| 2,558,212 | Evans | June 26, 1951 |
| 2,629,936 | Cronstedt | Mar. 3, 1953 |
| 2,703,456 | Smyth | Mar. 8, 1955 |
| 2,709,854 | Price | June 7, 1955 |

FOREIGN PATENTS

| | | |
|---|---|---|
| 714,081 | Great Britain | Aug. 25, 1954 |